(No Model.)
2 Sheets—Sheet 1.
S. D. POOLE.
WHEEL CULTIVATOR.
No. 521,548.  
Patented June 19, 1894.
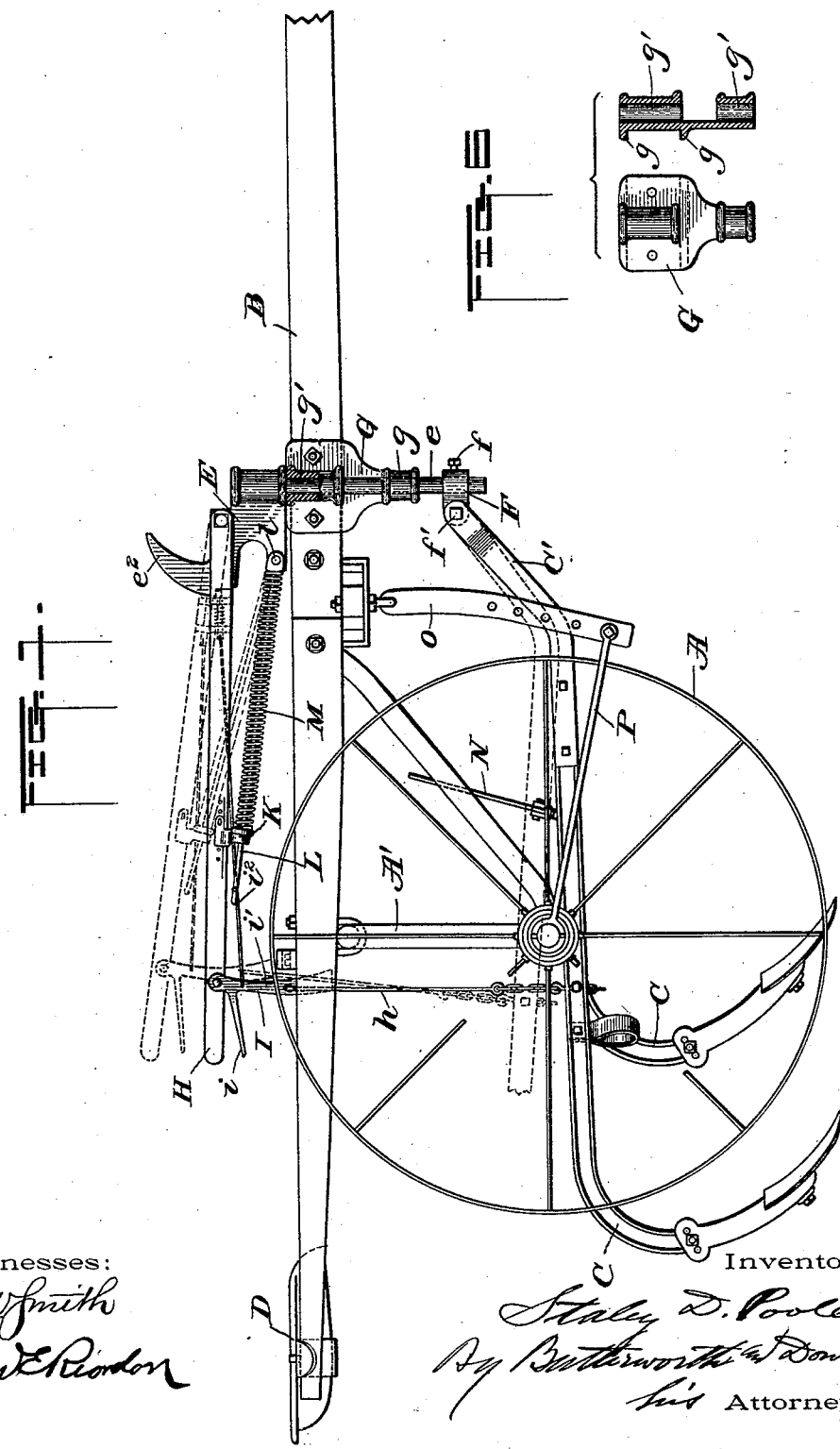
Witnesses:  
Inventor.

(No Model.) S. D. POOLE. 2 Sheets—Sheet 2.
WHEEL CULTIVATOR.
No. 521,548. Patented June 19, 1894.
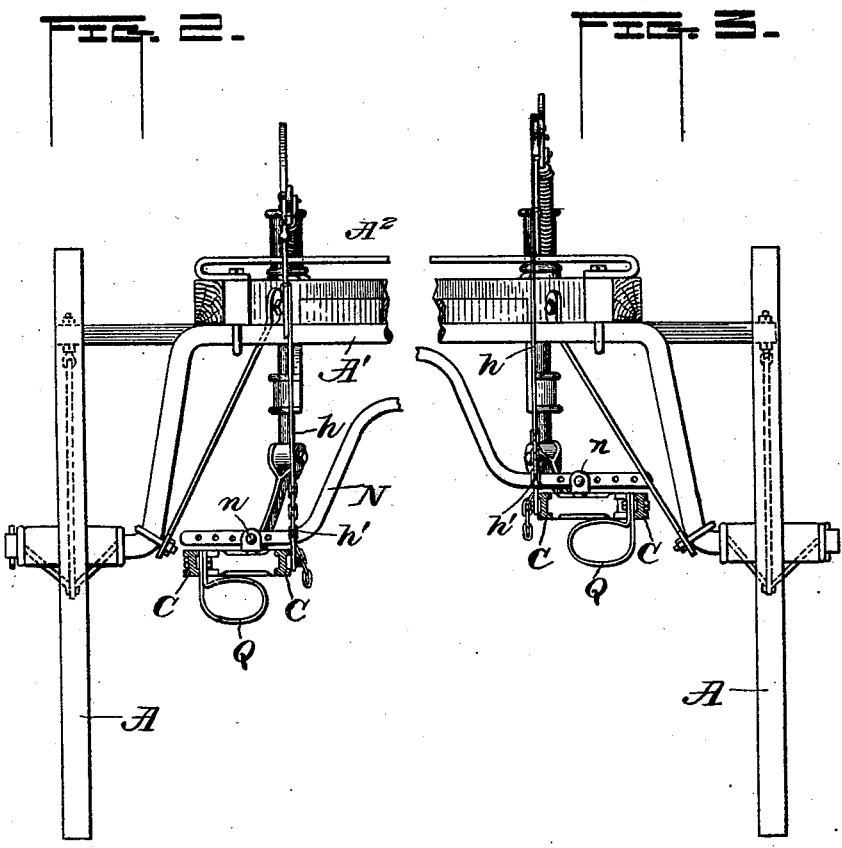
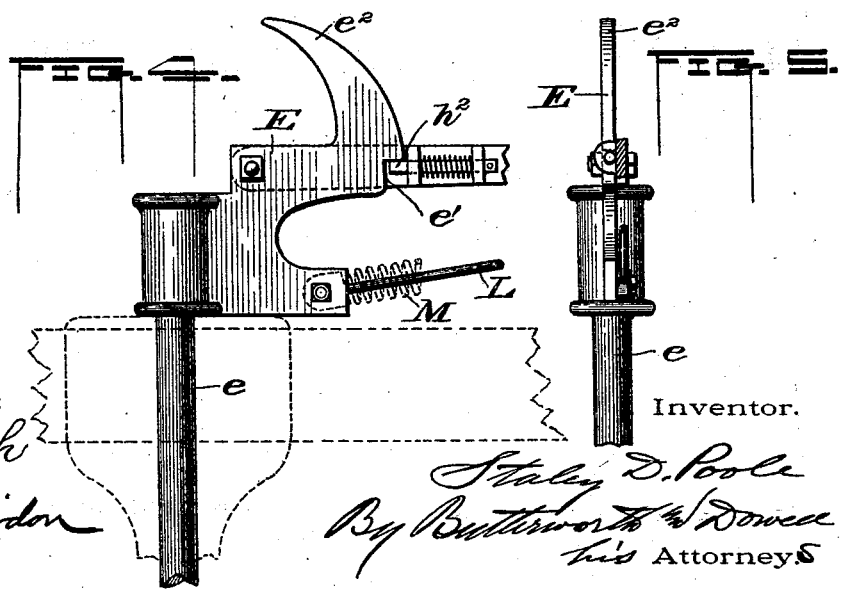

UNITED STATES PATENT OFFICE.

STALEY D. POOLE, OF MOLINE, ILLINOIS, ASSIGNOR TO THE DEERE & COMPANY, OF SAME PLACE.

WHEEL-CULTIVATOR.

SPECIFICATION forming part of Letters Patent No. 521,548, dated June 19, 1894.

Application filed January 20, 1894. Serial No. 497,555. (No model.)

*To all whom it may concern:*

Be it known that I, STALEY D. POOLE, a citizen of the United States, residing at Moline, in the county of Rock Island and State of Illinois, have invented certain new and useful Improvements in Wheel-Cultivators; and I do hereby declare the following to be a full, clear, and exact description of the invention, such as will enable others skilled in the art to which it appertains to make and use the same.

This invention relates to improvements in wheeled cultivators.

The invention consists in certain improved features of construction and combinations of parts, all as will be hereinafter more fully described and then pointed out in the claims at the end of the description.

In the accompanying drawings, which form a part of this specification and in which similar letters of reference denote similar parts, Figure 1 represents a side elevation of a wheeled cultivator embodying my invention. Fig. 2 is a rear view, partly in section, of the left-hand side of the cultivator, showing the cultivator beams lowered into operative position; and Fig. 3 is a similar view of the right-hand side of the machine showing the beams elevated; the cultivator blades or shovels not being shown in either case. Fig. 4 is a detail of the swinging locking plate and journal pin; and Fig. 5 is a rear view of the same. Fig. 6 represents a side view and a vertical section of the hanger.

In the drawings A, A, denote the wheels; A', the usual arched axle; B the usual split tongue or frame, and C the hinged beams of a wheeled cultivator of ordinary construction having the usual driver's seat D, mounted on the rear end of the tongue or frame.

The beams C, C, may be arranged in pairs, as shown, one pair at either side of the machine center, and are hinged at their forward ends in any proper manner to a pendent rod or pin $e$, journaled in a suitable bracket or hanger secured to the tongue or frame; for instance, by means of a sleeve F, fitting on the rod $e$, and secured by a set screw $f$, the beams being hinged to the sleeve by a bolt $f'$, passing through an eye of the sleeve and through openings in the forked end of the beam or a metallic plate C', forming an extension thereof. The rod or bolt $e$, at each side of the machine is journaled in a hanger G, which may be bolted or otherwise suitably secured to the tongue or frame B, and is preferably formed integrally with a locking plate E, which, by reason of the journaling of the rod, is permitted to swing laterally within certain limits with the lever H, which is hinged thereto. The lever H, has its front end pivoted to the plate E, and extends rearwardly therefrom to within convenient reach of the driver sitting on the seat D; being provided near its rear end with a dog or angle lever I, which is pivoted at its angle to said lever with its horizontal arm $i$, in position to be clasped by the hand of the operator, and its perpendicular arm $i'$, arranged in rear of and adjacent to the cross beam or axle A', so that when the lever is raised to the position indicated in dotted lines in Fig. 1, said arm $i'$, of the dog may rest upon a cross bar A², (or the axle A') and hold the cultivator beams in an elevated position; the lever being connected to said beams by means of a rod and chain $h$, $h'$, or other suitable connection. The vertical arm $i'$, of the dog I is also connected by rod $i^2$, with a spring-pressed pawl or detent $h^2$, which is adapted to engage a notch $e'$, in the plate E, so as to lock the lever against vertical movement when the cultivator is in use. The plate E is provided with an upwardly and forwardly curved projection or horn $e^2$, against which the detent $h^2$, impinges when the dog I is operated to release the detent and permit the lever H, to be lifted to the position indicated in dotted lines in Fig. 1, in position to be guided back into the notch when the lever is moved downward. The lever H is also preferably provided intermediate its ends with an adjustable eye-piece or casting K, through the eye of which passes the free end of a rod L, the front end of which is pivoted to the bracket E, as at $l$, and a coiled or other suitable spring M, is placed on the rod L, between the eye-piece K and a shoulder or enlargement on the rod L, near its pivoted end; said spring being held under compression and tending normally to raise the lever, so that when the lever is raised the spring will assist in raising the cultivators. The hanger consists of a plate G, having flanges $g, g$, on the back thereof to overlap the top and bottom edges of the timber B, and on its opposite side a pair of sockets $g', g'$, to receive the vertical pin or rod $e$; the plate with its pendent arm, sockets and flanges being cast in a single piece.

In order to preserve a uniform distance between the cultivator blades, in operation, an arched connecting bar N, may be pivotally connected with the beams C, C, by means of swivel connections $n$, or in any proper manner; the connection being such as to permit of lateral adjustment for the purpose of increasing or diminishing the distance between the beams at will. Draft attachments O, connecting with the draft-rods P, and stirrups or foot-rests Q, of ordinary construction may also be provided.

The operation of the invention will be readily understood from the foregoing description. The machine being drawn along over the ground in the usual manner, the driver occupying the seat D may place his feet in the stirrups Q, to aid in controlling and guiding the cultivator blades, and may elevate either or both beams at will by manipulating the dog I, so as to release the detent $h^2$, whereupon the compressed spring M, will exert an upward lifting force upon the lever H and through said lever and its connection with the beams will assist in raising the plows or cultivator blades. Said lever having been lifted to the position indicated in dotted lines in Fig. 1, the perpendicular arm $i'$, of the dog will be drawn forward sufficiently to rest upon the cross-beam $A^2$, or axle of the wheeled frame and support the plows above the ground, in which position the operator may still rest his feet in the stirrups while the machine is passing over obstructions or being transported from place to place. To lower the plows the operator will simply release the dog and depress the lever H, until the detent $h^2$, passes beneath the notch $e'$ of the locking plate E, in which position the operating lever will be locked until again released by the manipulation of the dog.

The connection of the beams and lever with the locking plate and hanger is such as to permit said parts to be readily removed when desired, for the purpose of renewing a broken part or substituting a new part when a locking plate or hanger becomes worn in use, and also for the purpose of "knocking down" the machine for the purpose of storing or transportation.

The machine is also very simple in construction, inexpensive in manufacture and efficient, durable and reliable in use.

Having thus fully described my invention, what I claim as new, and desire to secure by Letters Patent of the United States, is—

1. In a wheeled cultivator, the combination with the hinged plow beams, of the operating lever connected thereto, the swinging locking plate to which said lever is pivoted, means for locking said lever, and a spring acting through said lever to assist in raising the plows when the lever is unlocked, substantially as described.

2. In combination with the plow beams, the lifting lever and detent carried thereby; the locking plate having the notch therein adapted to be engaged by said detent, and the dog adapted to release said detent and sustain said lever in an elevated position when the latter is raised, substantially as described.

3. In combination with the plow beams and the lifting lever, the power-storing spring bearing upon the lever and adapted to assist in raising the beams when the lever is unlocked, the swinging locking plate to which said lever is pivoted, the detent, and the dog for actuating said detent so as to release the lifting lever, substantially as described.

4. In combination with the hinged plow beams and the pivoted lever for raising said beams, the swinging locking plate having the journal pin to which said beams are hinged, means for locking and releasing said lever, and a spring extending between the lever and locking plate and tending normally to raise the lever, substantially as described.

5. In a wheeled cultivator, the hanger consisting of a broad flat plate or casting adapted to be secured to the tongue or frame and having a socket upon the front face thereof and a narrow pendent portion with a similar socket; said sockets being formed integrally with the plate and adapted to receive the journal pin to which the plow beams are hinged, substantially as described.

6. In a wheeled cultivator, the swinging locking plate adapted for the pivotal attachment of the lifting lever and formed integrally with a journal pin to which the cultivator beams are secured, the said plate being arranged at the end of the pin opposite the point of attachment of the beams, substantially as described.

7. In combination with the hanger having the sockets formed integrally therewith, the swinging locking plate provided with a pendent pin or rod journaled in said sockets; said hanger and plate being adapted for the pivotal attachment of the plow beams and lifting lever, respectively, so as to permit the latter to swing laterally in unison with each other, substantially as described.

8. In combination with the hanger removably secured to the machine frame, the journal pin detachably fitted in sockets on said hanger and the beams secured to said pin; the latter having a notched locking plate formed integrally therewith for the pivotal attachment of the lifting lever, substantially as described.

9. A wheeled cultivator comprising the wheeled frame, the hanger depending from said frame, the pins or rods journaled in bearings carried by said hangers, the plow beams hinged to said pins, the swinging locking plates mounted on said pins, the levers pivoted to said locking plates, the springs acting on said levers and tending normally to raise said beams, and means for locking and releasing the levers, substantially as described.

In testimony whereof I affix my signature in presence of two witnesses.

STALEY D. POOLE.

Witnesses:
WM. BUTTERWORTH,
A. R. EBI.